United States Patent
Stoakes et al.

(10) Patent No.: US 11,781,667 B2
(45) Date of Patent: Oct. 10, 2023

(54) FLUID VALVES WITH AN ANTI-STAGNATION TRIM GUIDE

(71) Applicant: Fisher Controls International LLC, Marshalltown, IA (US)

(72) Inventors: Trevor J. Stoakes, Peculiar, MO (US); Cory A. Hagen, Johnston, IA (US); Katherine N. Bartels, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/403,644

(22) Filed: Aug. 16, 2021

(65) Prior Publication Data
US 2023/0050871 A1    Feb. 16, 2023

(51) Int. Cl.
*F16K 1/12*    (2006.01)
*F16K 27/02*    (2006.01)

(52) U.S. Cl.
CPC ............ *F16K 27/0254* (2013.01); *F16K 1/12* (2013.01)

(58) Field of Classification Search
CPC ... F16K 3/24; F16K 3/246; F16K 1/00; F16K 1/12; F16K 39/02; F16K 39/022; F16K 39/04
USPC ........................................................ 251/282
See application file for complete search history.

(56) References Cited

U.S. PATENT DOCUMENTS

| | | | | |
|---|---|---|---|---|
| 3,542,056 A * | 11/1970 | Chinn | ................... | F16K 39/022 137/271 |
| 4,746,093 A * | 5/1988 | Scanderbeg | .......... | F16K 31/408 251/38 |
| 5,048,790 A * | 9/1991 | Wells | .................... | F16K 31/408 251/44 |
| 5,531,422 A * | 7/1996 | Ward | .................. | F16K 31/0693 251/282 |
| 5,564,674 A * | 10/1996 | Kalin | .................... | F16K 31/408 251/38 |
| 5,769,123 A * | 6/1998 | Heestand | ................ | F16K 39/04 251/282 |
| 6,073,651 A * | 6/2000 | Conrads | ................ | F16K 39/022 251/36 |
| 2018/0266568 A1* | 9/2018 | Gabriel | ................. | F16K 39/022 |
| 2019/0243394 A1* | 8/2019 | Bartels | ................... | G05D 16/02 |

FOREIGN PATENT DOCUMENTS

CN        113090763 A  *  7/2021

* cited by examiner

*Primary Examiner* — Hailey K. Do
(74) *Attorney, Agent, or Firm* — HANLEY, FLIGHT & ZIMMERMAN, LLC (57) ABSTRACT

Fluid valves with an anti-stagnation trim guide are disclosed herein. An example valve includes a valve body including a fluid inlet, a fluid outlet, and a fluid passageway extending between the fluid inlet and the fluid outlet, a plug disposed in the fluid passageway, and a trim guide positioned between the plug and the valve body, the trim guide including at least one balance passageway, the balance passageway to guide trapped process fluid to enter or exit an area between the plug and a bonnet of the valve during movement of the plug.

17 Claims, 6 Drawing Sheets

FLUID VALVES WITH AN ANTI-STAGNATION TRIM GUIDE

FIELD OF THE DISCLOSURE

This disclosure relates to fluid valves and, more specifically, to fluid valves with an anti-stagnation trim guide.

BACKGROUND

Process systems often include industrial fluid valves with plugs that are moved by a valve stem relative to a valve seat to vary an amount of fluid flow flowing therethrough. Fluid valves designed for specific applications, such as urea production, provide tolerance for high pressure drops and crystallization, in addition to minimizing vibration, noise, and plugging that can occur with valves that are not intended for urea letdown applications.

SUMMARY

An example valve includes a valve body including a fluid inlet, a fluid outlet, and a fluid passageway extending between the fluid inlet and the fluid outlet. The example valve also includes a plug disposed in the fluid passageway and a trim guide positioned between the plug and the valve body, the trim guide including at least one balance opening, the balance opening to guide trapped process fluid to enter or exit an area between the plug and a bonnet of the valve during movement of the plug.

An example valve includes a valve body including a fluid inlet, a fluid outlet, and a fluid passageway extending between the fluid inlet and the fluid outlet. The example valve also includes a plug disposed in the fluid passageway and a trim guide positioned between a stem of the plug and the valve body, the trim guide including at least one relief cut to prevent process fluid trapping between the trim guide and the valve body.

An example apparatus includes an anti-stagnation trim guide configured to be disposed between a valve plug and a valve body, the anti-stagnation trim guide including at least one relief cut, the relief cut to prevent process fluid stagnation, the anti-stagnation trim guide including at least one balance opening, the balance opening to guide trapped process fluid to enter or exit an area between the plug and a valve bonnet.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Letdown valves can be used in various applications to permit reductions in pressure (e.g., from a high pressure to a low pressure). As such, letdown valves are designed to tolerate high pressure drops and can be used in applications such as urea letdown or decoking. In urea production, letdown valves can also be designed to tolerate crystallization. Urea is a chemical reactant and precursor commonly used in the production of plastics, paper, fertilizers, and resins. A urea letdown process can occur near the end of a production cycle, typically involving using a letdown valve to reduce pressure. Urea letdown valves are exposed to potentially corrosive particulates present during the flow of urea through the valve. During the high-velocity flow of urea through the letdown valve, stagnation of fluid can occur between a valve plug and a valve body of the letdown valve, leaving behind urea deposits. Stagnant flow can occur between guiding surfaces of the sliding valve stem trim. For example, a primary guiding surface includes an area between the valve body and a post guide for the valve plug. Such surfaces must be maintained to ensure the functionality of the plug stem assembly. Known techniques for preventing fluid and/or deposit build-up due to stagnation include flushing connections that require steam line placement. Such steam lines can be used for flushing between a liner and the plug, but do not provide for ongoing anti-stagnation and introduce additional leak paths.

Fluid valves with an anti-stagnation trim guide disclosed herein can be used to prevent process fluid stagnation along guiding surfaces of the sliding valve stem trim in letdown valves and/or decoking valves. For example, the anti-stagnation trim guide can include balance passageways to allow trapped fluid to enter and/or escape an area behind the valve plug when the valve plug is stroked. The anti-stagnation trim guides disclosed herein allow fluid to freely pass the guiding surfaces of the sliding valve stem trim, thereby equalizing pressure in areas located behind the valve plug where process fluid stagnation would otherwise occur. For example, trapped process fluid can thereby enter or exit an area between the plug and a bonnet of the valve during movement of the plug using the anti-stagnation trim guide disposed between the valve plug and the valve body.

Figure 1A:
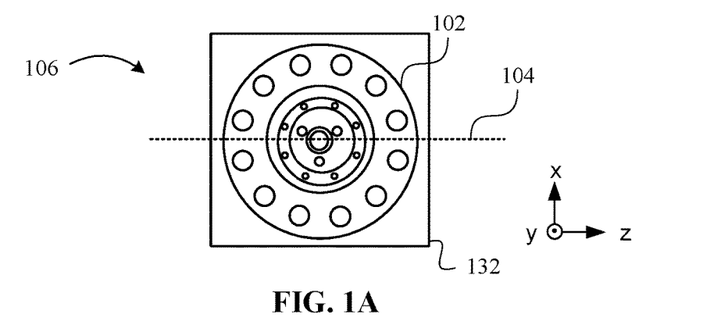
FIG. 1A is a top view of a valve bonnet positioned on a valve body.

FIG. 1A is a top view of an example valve bonnet 102 positioned on a valve body 132 of a valve 106. The valve bonnet 102 provides a cover for an opening in the valve body 132 and can be connected to the valve body 132 using a threaded, bolted, and/or welded joint. The bonnet 102 couples the valve body 132 to an actuator (e.g., a pneumatic actuator). The bonnet 102 can be attached to the valve body 132 once the internal components (e.g., stem, plug, etc.) have been positioned within the valve body 132. In the example of FIG. 1A, an example first sectioning line 104 indicates the location of a top-down cross-section of the valve body 132 depicted in the example of FIG. 1C.

Figure 1B:
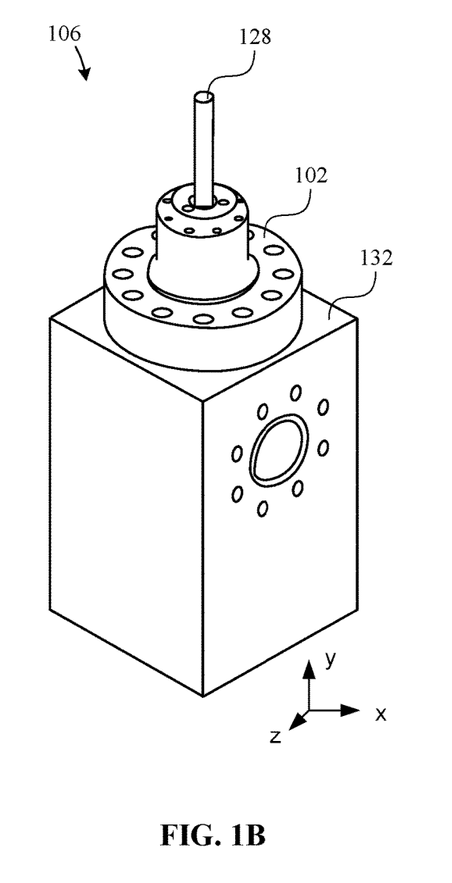
FIG. 1B is a perspective side view of the valve bonnet and valve body of FIG. 1A.

In an example perspective side view of FIG. 1B, the valve 106 is shown including the bonnet 102, an example stem 128, and the example valve body 132. Once the bonnet 102 is attached to the valve body 132, the bonnet 102 retains components of a valve trim within the valve body 132. The valve trim can include internal components (e.g., a valve plug, a valve seat, a cage, a stem, etc.) of the valve 106 that control fluid flow between an inlet and an outlet of the valve 106.

Figure 1C:
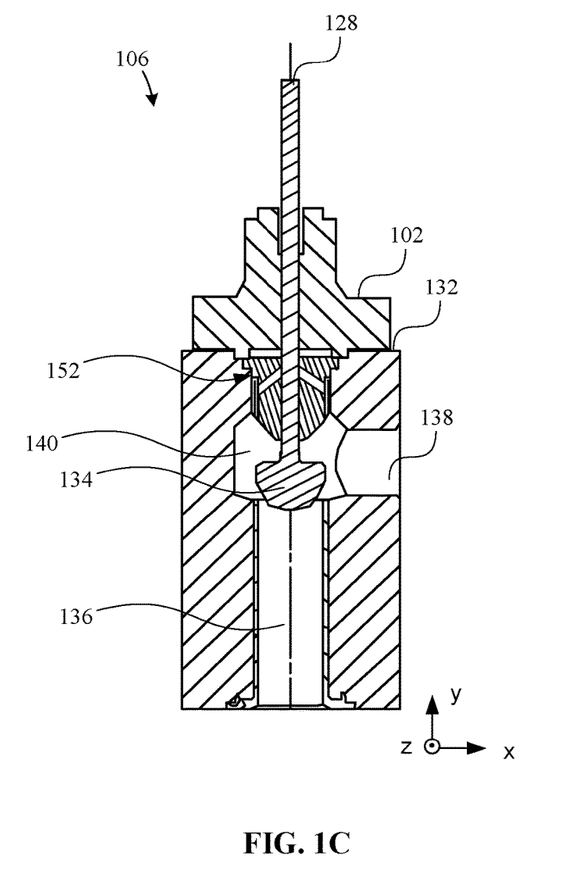
FIG. 1C is a cross-sectional view of the valve bonnet and valve body of FIGS. 1A and 1B, including a cross-sectional view of a first trim guide.

FIG. 1C shows an example cross-sectional view of the valve 106 of FIGS. 1A and 1B along the first sectioning line 104 of FIG. 1A. In the example of FIG. 1C, the stem 128 operatively couples an example valve plug 134 to an actuator (not shown). The valve plug 134 can have any type of structure to vary the flow of fluid through an example passageway 140 of the valve 106 from an example inlet 136 to an example outlet 138. In the illustrated example, a fluid flows through the fluid flow passageway 140 in a flow-up orientation. In FIG. 1C, an example trim guide 152 is positioned between the stem 128 and the valve body 132. In the example of FIG. 1C, the trim guide 152 includes a central bore to guide the stem 128 during a stroke of the valve 106. The trim guide 152 can also include at least one relief cut to prevent process fluid trapping between the trim guide 152 and the valve body 132, as described in more detail in connection with FIGS. 2A-2C.

Figure 2A:
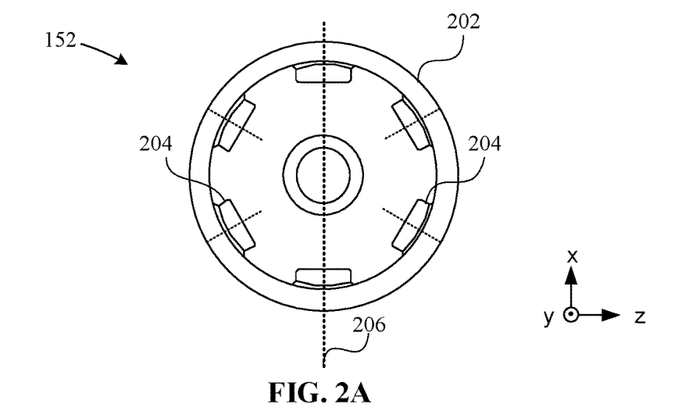
FIG. 2A is a bottom view of the first trim guide of FIG. 1C.

FIG. 2A is an example bottom view of the first trim guide 152 of FIG. 1C. The first trim guide 152 includes an example top surface 202 and example relief cut(s) 204 positioned circumferentially around a body of the first trim guide 152 to prevent process fluid stagnation. For example, the relief cut(s) 204 can be positioned in areas around the first trim guide 152 where fluid stagnation is most likely to occur in letdown valves and/or decoking valves as the valve plug 134 strokes. In FIG. 2A, an example second sectioning line 206 indicates the location of a top-down cross-sectional area of the first trim guide 152 depicted in the example of FIG. 2C.

Figure 2B:
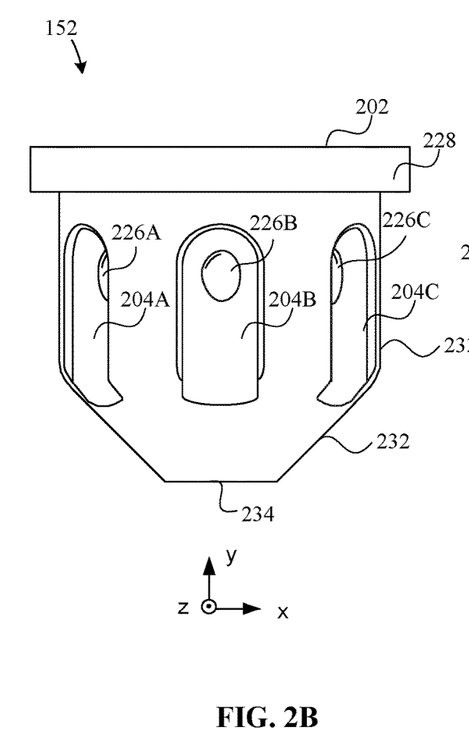
FIG. 2B is a side view of the first trim guide of FIG. 1C and FIG. 2A.

FIG. 2B is an example side view of the first trim guide 152 of FIG. 2A. The first trim guide 152 includes example relief cut(s) 204A, 204B, 204C, example lower passageway opening(s) 226A, 226B, 226C, an example protruding surface 228, an example lower body 232, an example upper body 233, and an example flat bottom 234. In the example of FIG. 2B, the first trim guide 152 includes the relief cut(s) 204A, 204B, 204C positioned circumferentially around the upper body 233 and/or the lower body 232 of the trim guide 152. Any number of relief cut(s) 204 can be positioned around the upper body 233 and/or the lower body 232 and are not limited to the number of relief cut(s) shown in the example of FIG. 2B. The relief cut(s) 204 can be positioned to decrease fluid stagnation in areas between the valve body 132 and the stem 128, as shown in the example of FIG. 1C. For example, the relief cut(s) 204A, 204B, 204C can support the lower passageway opening(s) 226A, 226B, 226C.

As shown in the example of FIG. 1C, as the plug 134 strokes, process fluid can stagnate in regions above the plug 134 (e.g., in the fluid flow passageway 140). In applications where the fluid includes corrosive particulates that can erode and/or damage the internal valve components (e.g., flow of urea though urea letdown valves), the presence of the lower passageway opening(s) 226A, 226B, 226C and/or the relief cut(s) 204A, 204B, 204C can guide fluid that would otherwise stagnate out of the regions between the valve body 132 and the stem 128, thereby avoiding the build-up of particulate deposits (e.g., urea deposits). For example, as the valve plug 134 strokes to allow fluid flow from the inlet 136 to the outlet 138, the process fluid can stagnate in regions within the fluid flow passageway 140 above the plug 134. The positioning of the first trim guide 152, as shown in the example of FIG. 1C, allows process fluid forced into areas near the stem 128 of the plug 134 to exit via the lower passageway opening(s) 226A, 226B, 226C connecting a central bore of the first trim guide 152 (e.g., a central bore within the trim guide passing from the flat bottom 234 of the trim guide to the top 202 of the trim guide) to the fluid flow passageway 140 via the relief cut(s) 204A, 204B, 204C.

In some examples, the first trim guide 152 includes the protruding surface 228 (e.g., a flange) to provide a barrier between process fluid exiting the lower passageway opening(s) 226A, 226B, 226C and a top-most region of the fluid flow passageway 140 (e.g., below the bonnet 102). In some examples, the protruding surface 228 is used to secure the first trim guide 152 to the valve 106. In some examples, the first trim guide lower body 232 is tapered below the relief cut(s) 204A, 204B, 204C to remove structural restrictions that would reduce the flow of process fluid from the lower passageway opening(s) 226A, 226B, 226C and/or the relief cut(s) 204A, 204B, 204C into the fluid flow passageway 140. In the example of FIG. 2B, the relief cut(s) 204A, 204B, 204C are shaped to cover a vertical region of the upper body 233 and/or the lower body 232. In some examples, the relief cut(s) 204A, 204B, 204C can extend into the lower body 232 as the upper body 233 transitions into the lower body 232. In some examples, the relief cut(s) 204A, 204B, 204C can include a rectangular shape with rounded edge(s). In some examples, the relief cut(s) 204A, 204B, 204C are depressed within the upper body 233 and/or the lower body 232 of the first trim guide 152, such that sections of the lower body 232 and/or the upper body 233 are removed to form the relief cut(s) 204A, 204B, 204C (e.g., the relief cut(s) 204A, 204B, 204C engraved into the upper body 233 and/or the lower body 232).

Figure 2C:
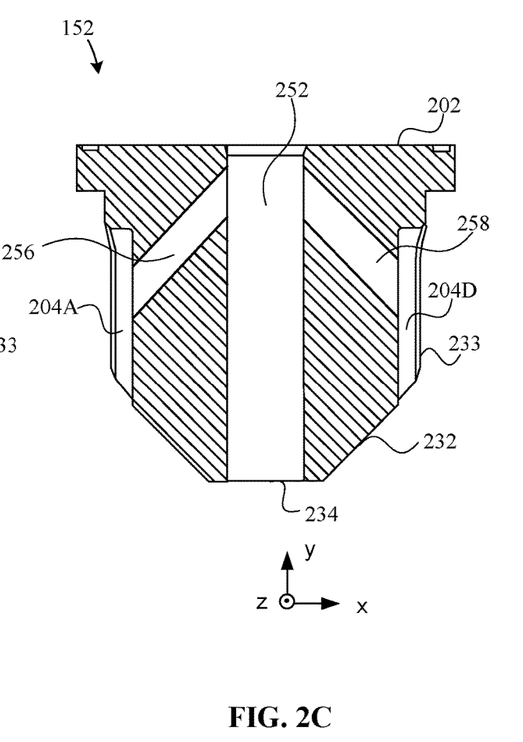
FIG. 2C is a cross-sectional view of the first trim guide of FIGS. 1C, 2A, and 2B.

FIG. 2C is an example cross-sectional view of the first trim guide 152 of FIGS. 1C, 2A, and 2B based on the second sectioning line 206 of FIG. 2A. The cross-sectional view includes the first trim guide top 202, the relief cut(s) 204A, 204D, the first trim guide lower body 232, the first trim guide upper body 233, the first trim guide bottom 234, an example central bore 252, an example first balance passageway 256, and an example second balance passageway 258. In the example of FIG. 2C, the central bore 252 permits upward and downward movement of the valve stem 128 within the first trim guide 152 during stroking of the valve 106. As such, the central bore 252 diameter can be determined based on the diameter of the stem 128. In the example of FIG. 2C, the first balance passageway 256 is fluidly coupled to the relief cut 204A and the second balance passageway 258 is fluidly coupled to the relief cut 204D. Therefore, any process fluid moving upwards within the central bore 252 as the stem 128 travels upward can exit via the balance passageway(s) 256, 258 and/or the relief cut(s) 204A, 204D, followed by entry into the fluid flow passageway 140. In some examples, the diagonal orientation of the balance passageway(s) 256, 258 allows for any process fluid reaching the top region of the central bore 252 to flow downwards along the balance passageway(s) 256, 258 without accumulating and/or stagnating in the region below the bonnet 102 of FIG. 1C. For example, the balance passageway(s) 256, 258 can be positioned along an inner section of the top surface 202 towards an underside of the top surface 202, the underside of the top surface 202 oriented towards the valve body 132. While in the example of FIG. 2C the balance passageway(s) 256, 258 are shown oriented diagonally, the balance passageway(s) 256, 258 and/or the relief cut(s) 204A, 204B, 204C, 204D can be arranged in any other way not limited to the arrangement shown in the examples of FIG. 2A-2C.

Figure 2D:
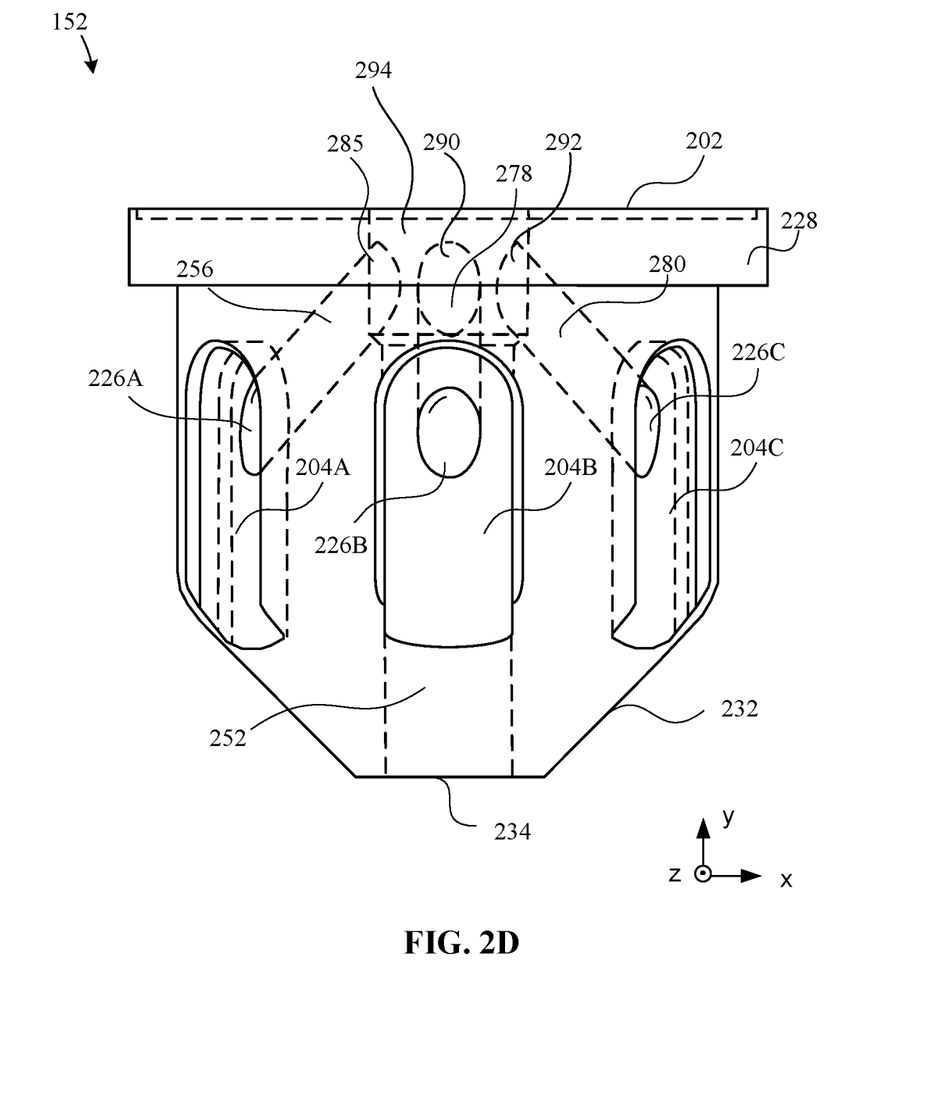
FIG. 2D is the side view of the first trim guide shown in FIG. 2B, including balance openings.

FIG. 2D is an example side view of the first trim guide 152 shown in FIG. 2B, including the relief cut(s) 204A, 204B, 204C. In the example of FIG. 2D, the relief cut(s) 204A, 204B, 204C include the lower passageway opening(s) 226A, 226B, 226C. The lower passageway opening(s) 226A, 226B, 226C lead to the first balance passageway 256, an example third balance passageway 278, and/or an example fourth balance passageway 280. The balance passageway(s) 256, 278, 280 join to the central bore 252 at example upper passageway opening(s) 285, 290, 292. In the example of FIG. 2D, the upper passageway opening(s) 285, 290, 292 are positioned adjacent to an example upper region 294 of the central bore 252. The upper region 294 of the central bore 252 can include a larger diameter compared to the rest of the central bore 252. As such, the upper region 294 can provide for a larger area to receive incoming process fluid flow as the fluid travels upwards with the rising stem 128, exits the upper region 294 via the upper passageway opening(s) 285, 290, 292, flows downwards through the balance passageway(s) 256, 278, 280, exits through the lower passageway opening(s) 226A, 226B, 226C, and enters the fluid flow passageway 140 via the relief cut(s) 204A, 204B, 204C. While the relief cut(s) 204A, 204B, 204C are shown in the example of FIG. 2D, the balance passageway(s) 256, 278, 280 can exit directly into the fluid flow passageway 140.

Figure 3A:
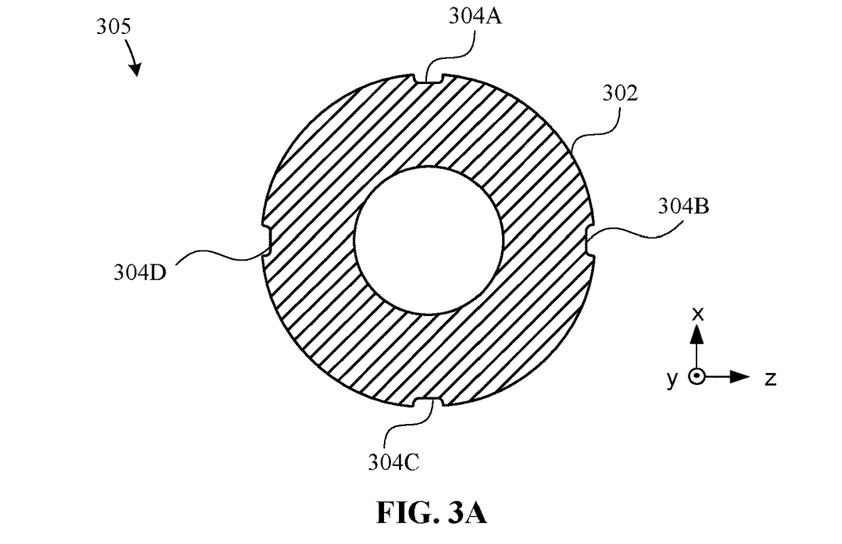
FIG. 3A is a cross-sectional view of relief cuts within a second trim guide.

FIG. 3A is an example cross-sectional view of an example second trim guide central body 302, including relief cut(s) 304A, 304B, 304C, 304D within an example second trim guide 305. While a total of four relief cut(s) 304A, 304B, 304C, 304D are shown in the example of FIG. 3A, any number of relief cut(s) can be included in the second trim guide 305. The first and/or second trim guide(s) 152, 305 can be used in letdown and/or decoking valves to prevent and/or reduce fluid stagnation between the bonnet 102 and the valve body 132.

Figure 3B:
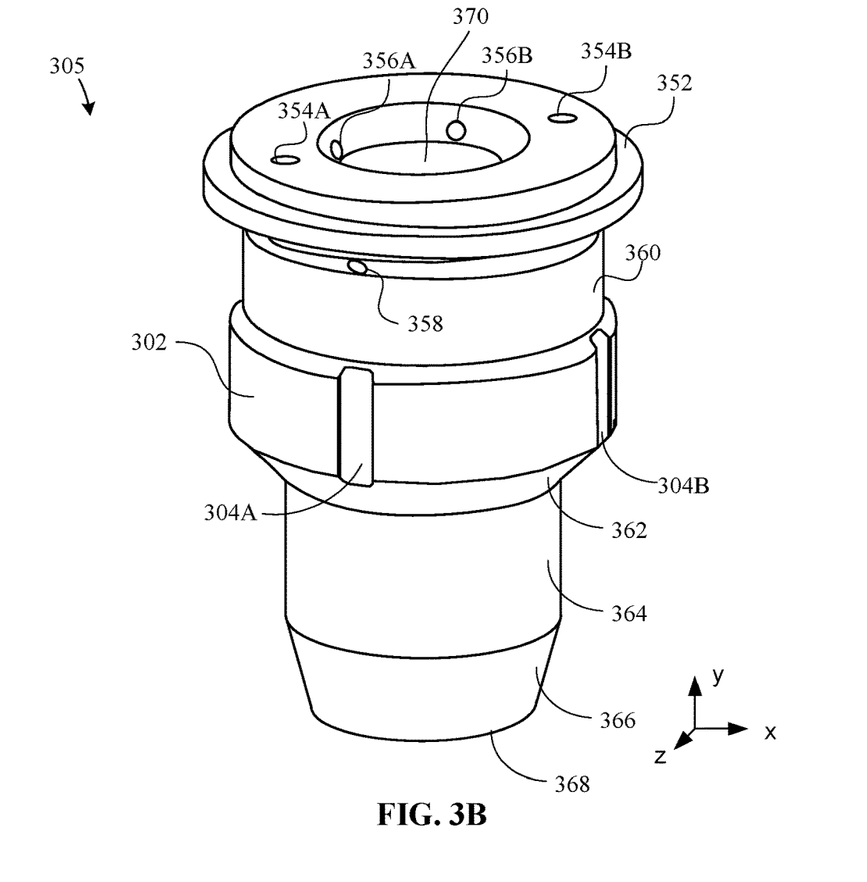
FIG. 3B is a side view of the second trim guide including the relief cuts of FIG. 3A.

FIG. 3B is an example side view of the second trim guide 305 including the relief cuts 304A, 304B of FIG. 3A. The second trim guide 305 includes an example upper region 352 used to secure the second trim guide 305 to the bonnet 102. For example, the upper region 352 includes attachment point(s) 354A, 354B to provide for threaded, bolted, and/or welded joint-based attachment to the bonnet 102. The upper region 352 also includes example upper passageway opening(s) 356A, 356B and an example lower passageway opening 358. In the example of FIG. 3B, process fluid rising upwards as the stem 128 is raised within a central bore 370 of the second trim guide 305 can exit the central bore 370 via the upper passageway opening(s) 356A, 356B and through the lower passageway opening(s) (e.g., lower passageway opening 358). As shown in the example of FIG. 3B, each upper passageway opening (e.g., upper passageway opening(s) 356A, 356B) includes a corresponding lower passageway opening to allow fluid to pass through balance passageway(s) within the second trim guide 305, as shown in the example of FIG. 4B. The second trim guide 305 further includes an example mid-region 360, an example first tapered region 362, an example elongated region 364, an example second tapered region 366, and an example bottom region 368. In the example of FIG. 3B, the mid-region 360 includes a first cross-sectional diameter, the central body 302 includes a second cross-sectional diameter, the elongated region 364 includes a third cross-sectional diameter, and the second tapered region 366 includes a fourth cross-sectional diameter. For example, the relief cut(s) 304A, 304B extend along the second cross-sectional diameter of the trim guide 305 (e.g., the second cross-sectional diameter forming the central body 302). In the example of FIG. 3B, the second cross-sectional diameter (e.g., forming the central body 302) is greater than (1) the first cross-sectional diameter (e.g., forming the mid-region 360), (2) the third cross-sectional diameter (e.g., forming the elongated region 364), and (3) the fourth cross-sectional diameter (e.g., forming the second tapered region 366). However, the cross-sectional diameters of the central body 302, the mid-region 360, the elongated region 364, and/or the second tapered region 366 are not limited to the relative diameters shown in the example of FIG. 3B. For example, in FIG. 3B, the cross-sectional diameters can be adjusted to be reduced along the downward length of the second trim guide 305 to allow for an increased process fluid outflow area below the lower passageway opening(s) (e.g., lower passageway opening 358). In some examples, the cross-sectional diameters can be adjusted to allow for proper positioning withing a given valve (e.g., a urea letdown valve and/or a decoking valve, etc.), as shown in connection with FIG. 5. In some examples, the cross-sectional area(s) can be adjusted to allow for process fluid outflow to migrate from the lower passageway opening(s) (e.g., lower passageway opening 358) towards the relief cut(s) 304A, 304B, and further down into the fluid flow passageway 140.

Figure 4A:
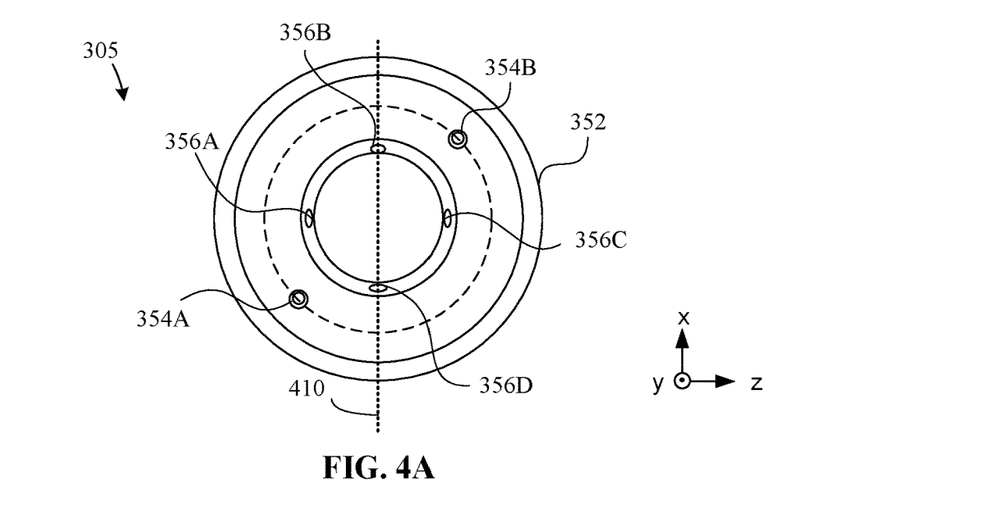
FIG. 4A is a top view of the second trim guide of FIGS. 3A and 3B.
Figure 4B:
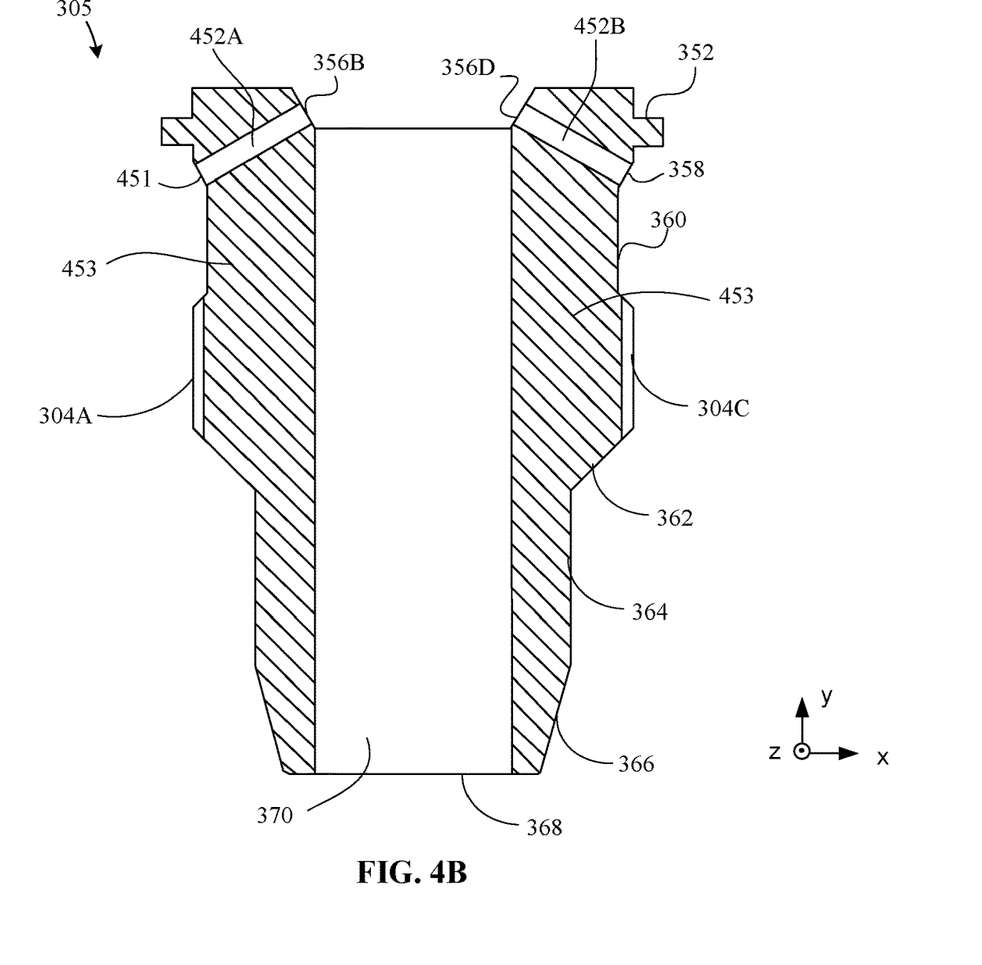
FIG. 4B is a cross-sectional view of the second trim guide of FIG. 3B.

FIG. 4A is an example top view of the second trim guide 305 of FIGS. 3A and 3B. The top view of the second trim guide 305 includes the upper region 352, the attachment point(s) 354A, 354B to provide for threaded, bolted, and/or welded joint-based attachment of the second trim guide 305 to the bonnet 102, and upper passageway opening(s) 356A, 356B, 356C, 356D. While in the example of FIG. 4A there are a total of two attachment point(s) 354A, 354B and a total of four upper passageway opening(s) 356A, 356B, 356C, 356D, any number of attachment point(s) and/or passageway opening(s) can be used based on, for example, the intended size of the second trim guide 305 and/or the intended application (e.g., letdown valve, decoking valve, etc.). In the example of FIG. 4A, a third sectioning line 410 is shown to indicate a top-down cross-sectional area of the second trim guide 305 depicted in the example of FIG. 4B.

FIG. 4B is an example cross-sectional view of the second trim guide 305 of FIG. 3B based on the third sectioning line 410 of FIG. 4A. In FIG. 4B, the second trim guide 305 includes the relief cut(s) 304A, 304C of FIG. 3B positioned on either side of the second trim guide 305. The second trim guide 305 of FIG. 4B also includes the upper region 352 and the upper passageway opening(s) 356B, 356D of FIG. 4A. Fluid flowing from the upper passageway opening(s) 356B, 356D downwards exits at lower passageway opening(s) 358, 451, thereby passing through example balance passageway(s) 452A, 452B. The balance passageway(s) 452A, 452B are positioned diagonally to allow for fluid flow to exit the second trim guide 305 and enter the fluid flow passageway 140 via the relief cut(s) 304A, 304C. The cross-sectional view also shows the variation in example cross-sectional area 453 along the entire length of the second trim guide 305. For example, the mid-region 360, the first tapered region 362, the elongated region 364, and the second tapered region 366 have varying cross-sectional diameters. In the example of FIG. 4B, a cross-sectional diameter of the mid-region 360 is greater than each of the cross-sectional diameters of the elongated region 364 and the second tapered region 366. In some examples, the decreasing cross-sectional diameters of the second trim guide 305 provide for a fixed positioning of the second trim guide 305 within a given valve (e.g., decoking valve, letdown valve, etc.). In some examples, the decreasing cross-sectional diameters of the second trim guide 305 allow for an increased contact area of fluid with the fluid flow passageway 140 as the fluid exits from the relief cut(s) 304A, 304C. For example, the second trim guide 305 of FIG. 4B includes an example central bore 370 connecting the bottom region 368 with the upper region 352. Any process fluid present in the central bore 370 can exit the second trim guide 305 and enter the fluid flow passageway 140 positioned below the relief cut(s) 304A, 304C by escaping via the balance passageway(s) 452A, 452B, as further described in connection with FIG. 5.

Figure 5:
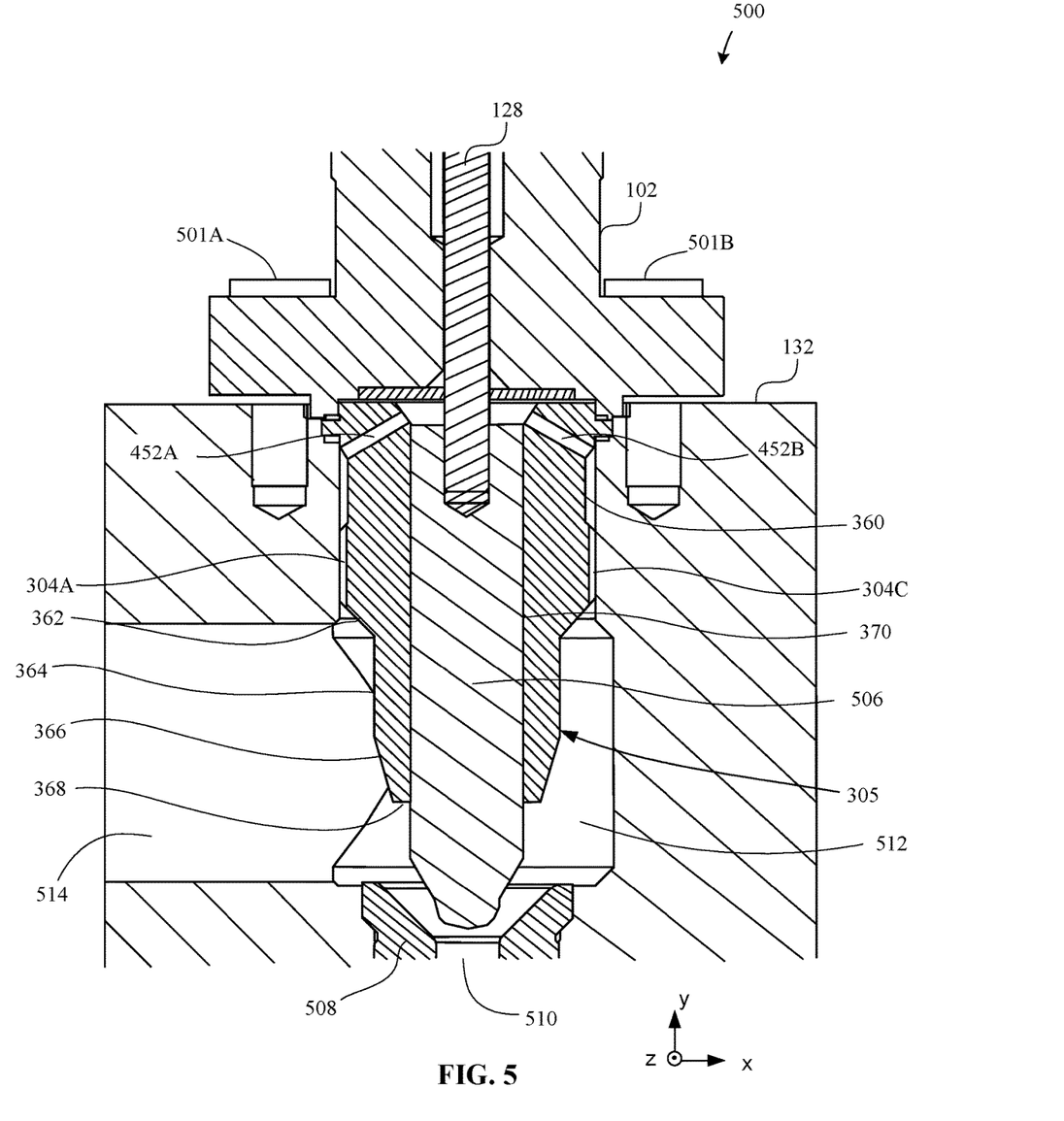
FIG. 5 is a cross-sectional view of the second trim guide of FIG. 4A positioned within a valve body.

FIG. 5 is an example cross-sectional view of the second trim guide 305 of FIG. 4A positioned within the valve body 132 of an example valve 500. In the example of FIG. 5, the second trim guide 305 is located in the interior of the valve body 132, below the bonnet 102. For example, the second trim guide 305 can be fixedly coupled to the valve body 132. In the example of FIG. 5, the bonnet 102 is secured to the valve body 132 using example threaded, bolted, and/or welded joint(s) 501A, 501B. The cross-sectional view of the second trim guide 305 shown in FIG. 5 corresponds to the cross-sectional view of FIG. 4B. The cross-sectional view of the valve body 132 includes an example plug 506, an example valve seat 508, an example inlet 510, an example fluid flow pathway 512, and an example outlet 514. In the example of FIG. 5, the plug 506 is attached to the stem 128 to operatively couple the plug 506 to an actuator, allowing the plug 506 to move in an upwards/downwards motion along the central bore 370 of the second trim guide 305, thereby modifying the rate of fluid flow through the valve 500. The valve seat 508 can include a seat ring to provide a seating surface for the plug 506 and assist in regulating the fluid flow through the valve 500. The process fluid enters the fluid flow pathway 512 from the inlet 510 as the plug 506 moves away from the valve seat 508. The process fluid then flows to the outlet 514 of the valve 500. However, during the high-velocity flow of process fluid through the valve 500 (e.g., a urea letdown valve, a decoking valve, etc.), stagnation of fluid can occur between the plug 506 and the valve body 132 (e.g., between guiding surfaces of the sliding valve stem trim). In applications that require the processing of potentially corrosive process fluid such as urea, the stagnating process fluid can leave behind urea deposits. A primary guiding surface that can experience such fluid stagnation includes an area between the valve body 132 and a post guide for the valve plug 506. Failure to maintain these surfaces compromises the functionality of the plug stem assembly.

In the example of FIG. 5, the second trim guide 305 provides exit points for stagnating fluid during high-velocity process fluid flow through the valve 500. For example, any process fluid that enters the central bore 370 can exit via the balance passageway(s) 452A, 452B and flow towards the relief cut(s) 304A, 304C by passing between the valve body 132 and the mid-region 360. Once the process fluid has entered the relief cut(s) 304A, 304C, the process fluid can exit into the fluid flow passageway 512 by passing between the valve body 132 and the first tapered region 362. The remaining regions of the second trim guide 305 (e.g., the elongated region 364, the second tapered region 366, and/or the bottom region 368) form the rest of the central bore 370 region within which the plug 506 is positioned, such that the plug 506 is movable relative to the second trim guide 305 along a longitudinal axis of the trim guide 305.

From the foregoing, it will be appreciated that the fluid valves with an anti-stagnation trim guide disclosed herein prevent process fluid stagnation along guiding surfaces of the sliding valve stem trim in letdown valves and/or decoking valves. In the examples disclosed herein, the anti-stagnation trim guide can include balance passageways to allow trapped fluid to enter and/or escape an area behind the valve plug when the valve plug is stroked. As such, trapped process fluid can thereby enter or exit an area between the plug and a bonnet of the valve during movement of the plug using the anti-stagnation trim guide disposed between the valve plug and the valve body.

Although certain example methods, apparatus and system have been disclosed herein, the scope of coverage of this patent is not limited thereto. On the contrary, this patent covers all methods, apparatus and articles of manufacture fairly falling within the scope of the claims of this patent.

What is claimed is:

1. A valve, comprising:
a valve body including a fluid inlet, a fluid outlet, and a fluid passageway extending between the fluid inlet and the fluid outlet;
a plug disposed in the fluid passageway; and
a trim guide positioned between the plug and the valve body, the trim guide including at least one balance passageway, the at least one balance passageway to guide trapped process fluid to enter or exit an area between the plug and a bonnet of the valve during movement of the plug, the at least one balance passageway positioned in a diagonal orientation between an underside of a top surface of the trim guide and a relief cut, wherein the trim guide includes relief cuts positioned circumferentially around a body of the trim guide.

2. The valve of claim 1, wherein the trim guide includes a central bore within the trim guide, the central bore to guide a stem of the plug during a stroke of the valve.

3. The valve of claim 1, wherein the at least one balance passageway is positioned along an inner section of a top surface of the trim guide towards an underside of the top surface, the underside of the top surface oriented towards the valve body.

4. The valve of claim 1, wherein the valve is a letdown valve or a decoking valve.

5. The valve of claim 1, wherein the relief cut is to prevent process fluid stagnation between the plug and the bonnet of the valve.

6. The valve of claim 5, wherein a body of the trim guide includes a surface with a first cross-sectional diameter, a second cross-sectional diameter, a third cross-sectional diameter, and a fourth cross-sectional diameter.

7. The valve of claim 6, wherein the relief cut extends along the second cross-sectional diameter of the trim guide.

8. The valve of claim 6, wherein the second cross-sectional diameter is greater than the first cross-sectional diameter, the third cross-sectional diameter, or the fourth cross-sectional diameter.

9. A valve, comprising:
a valve body including a fluid inlet, a fluid outlet, and a fluid passageway extending between the fluid inlet and the fluid outlet;
a plug disposed in the fluid passageway; and
a trim guide positioned between a stem of the plug and the valve body, the trim guide including at least one relief cut to prevent process fluid trapping between the trim guide and the valve body, the trim guide including a balance passageway positioned in a diagonal orientation towards an underside of a top surface of the trim guide, wherein the trim guide includes relief cuts positioned circumferentially around a body of the trim guide.

10. The valve of claim 9, wherein the trim guide includes a central bore within the trim guide, the central bore to guide the stem of the plug during a stroke of the valve.

11. The valve of claim 9, wherein the valve is a decoking valve or a letdown valve.

12. The valve of claim 9, wherein each relief cut extends from a surface of the trim guide body, the surface having a first cross-sectional diameter and a second cross-sectional diameter different than the first cross-sectional diameter.

13. The valve of claim 12, wherein the first cross-sectional diameter is greater than the second cross-sectional diameter.

14. An apparatus, comprising:
an anti-stagnation trim guide configured to be disposed between a valve plug and a valve body, the anti-stagnation trim guide including at least one relief cut, the relief cut to prevent process fluid stagnation, the anti-stagnation trim guide including at least one balance passageway, the at least one balance passageway to guide trapped process fluid to enter or exit an area between the plug and a valve bonnet, the at least one balance passageway positioned in a diagonal orientation towards an underside of a top surface of the trim guide, wherein at least two relief cuts are positioned circumferentially around a body of the anti-stagnation trim guide.

15. The apparatus of claim 14, wherein the valve plug is movable relative to the anti-stagnation trim guide along a longitudinal axis of the anti-stagnation trim guide.

16. The apparatus of claim 14, wherein the anti-stagnation trim guide is to be fixedly coupled to the valve body.

17. The apparatus of claim 14, wherein the anti-stagnation trim guide includes a central bore within the anti-stagnation trim guide, the central bore to guide a stem of the valve plug during a stroke of the valve.

* * * * *